United States Patent
Osawa et al.

(10) Patent No.: US 12,417,612 B2
(45) Date of Patent: Sep. 16, 2025

(54) RAIL DETECTING DEVICE AND RAIL DETECTION METHOD

(71) Applicant: Mitsubishi Electric Corporation, Tokyo (JP)

(72) Inventors: Shunya Osawa, Tokyo (JP); Ryota Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 231 days.

(21) Appl. No.: 18/137,660

(22) Filed: Apr. 21, 2023

(65) Prior Publication Data
US 2023/0260246 A1 Aug. 17, 2023

Related U.S. Application Data

(63) Continuation of application No. PCT/JP2020/045568, filed on Dec. 8, 2020.

(51) Int. Cl.
*G06V 10/44* (2022.01)
*G06V 10/20* (2022.01)
(Continued)

(52) U.S. Cl.
CPC .......... *G06V 10/457* (2022.01); *G06V 10/255* (2022.01); *G06V 10/267* (2022.01); *G06V 20/50* (2022.01)

(58) Field of Classification Search
CPC .. G06V 10/457; G06V 10/255; G06V 10/267; G06V 20/50; G06V 20/56;
(Continued)

(56) References Cited

U.S. PATENT DOCUMENTS 6,163,755 A    12/2000  Peer et al.
2019/0259281 A1*  8/2019  Martin .................. G08G 1/056
(Continued)

FOREIGN PATENT DOCUMENTS

CN    110537206 A  * 12/2019  ............. G06V 20/38
CN    112508892 B  * 10/2024  ............. B61L 23/041
(Continued)

OTHER PUBLICATIONS

"Espino et al., Rail Extraction technique using gradient information and a priori shape model, 2012 15th International IEEE Conference on Intelligent Transportation Systems, pp. 1132-1136" (Year: 2012).*
(Continued)

*Primary Examiner* — Ming Y Hon
*Assistant Examiner* — Dominique James
(74) *Attorney, Agent, or Firm* — Birch, Stewart, Kolasch & Birch, LLP

(57) ABSTRACT

A rail detecting device includes: a starting-region rail-starting-point redesignating unit that shifts a starting region for detecting rails to set a modified starting region and designates modified starting points of two rails at the lower edge of the modified starting region when portions of the two rails are not detected based on rail segments in an image; a rail-candidate detecting unit that detects multiple lines in the modified starting region as multiple modified rail candidates, the lines being candidates of edges of the two rails; a starting-region-rail assigning unit that assigns modified rail candidates whose lowest ends are closest to the corresponding modified starting points out of the multiple modified rail candidates as tentative modified rail segments; and a starting-region-rail disappearance determining unit that establishes the tentative modified rail segments as modified rail segments when distances between the lowest ends of the tentative modified rail segments.

17 Claims, 11 Drawing Sheets

(51) Int. Cl.
   *G06V 10/26* (2022.01)
   *G06V 20/50* (2022.01)
(58) Field of Classification Search
   CPC ....... G06V 20/588; B61L 23/00; B60R 21/00; G06T 7/60
   See application file for complete search history.

(56) References Cited

U.S. PATENT DOCUMENTS

| | | |
|---|---|---|
| 2020/0050882 A1 | 2/2020 | Futagami et al. |
| 2020/0307661 A1 | 10/2020 | Hania et al. |
| 2021/0245747 A1* | 8/2021 | Naithani ............... B61L 25/025 |

FOREIGN PATENT DOCUMENTS

| | | | |
|---|---|---|---|
| FR | 3019508 A1 * | 10/2015 | ............. B61L 23/04 |
| JP | 2016-91506 A | 5/2016 | |
| JP | 2018-181254 A | 11/2018 | |
| JP | 2019209734 A * | 12/2019 | |

OTHER PUBLICATIONS

"Wu et al., Real Time Railway Extraction by Angle Alignment Measure, 2015 IEEE International Conference on Image Processing (ICIP), pp. 4560-4564" (Year: 2015).*

"Maire, Vision based anti-collision system for rail track maintenance vehicles, 2007 IEEE Conference on Advanced Video and Signal Based Surveillance, pp. 170-175" (Year: 2007).*

"Gibert et al., Deep Multitask Learning for Railway Track Inspection, IEEE Transactions on Intelligent Transportation Systems, vol. 18, No. 1, pp. 153-164, 2017" (Year: 2017).*

Duda et al., "Use of the Hough transformation to detect lines and curves in pictures", Comm. Assoc. Comput. Mar. 15, 1972, pp. 11-15.

Stein et al., "Vision-based ACC with a Single Camera: Bounds on Range and Range Rate Accuracy", MobileEye 2003, IEEE, 2003, total 6 pages.

Indian Office Action and Search Report for Indian Application No. 202347038423, dated Jun. 11, 2025, with English translation.

* cited by examiner

| | |
|---|---|
| CAMERA INSTALLATION HEIGHT (VERTICAL) AS VIEWED FROM RAILS | 2650mm |
| CAMERA INSTALLATION WIDTH (HORIZONTAL) AS VIEWED FROM RAILS | 300mm |
| CAMERA FOCAL LENGTH (VERTICAL) | 6000pixel |
| CAMERA FOCAL LENGTH (HORIZONTAL) | 6000pixel |
| RAIL GAUGE | 1067mm |
| RAIL HEAD WIDTH | 65mm |

RAIL DETECTING DEVICE AND RAIL DETECTION METHOD

CROSS-REFERENCE TO RELATED APPLICATION

This application is a continuation application of International Application No. PCT/JP2020/045568 having an international filing date of Dec. 8, 2020.

BACKGROUND OF THE INVENTION

1. Field of the Invention

The disclosure relates to a rail detecting device and a rail detection method.

2. Description of the Related Art

Conventionally, devices that detect rails in images are known for the purpose of inspecting railway rails or detecting obstacles present on the rails. For example, the device described in Patent Literature 1 extracts an initial region and a search region on top of the initial region from a captured image and detects rails in the initial region on the basis of a feature quantity. The device then specifies the rails in the search region on top by repeating the process of detecting rails from line segments extending from the top ends of the rails detected in the initial region on the basis of the feature quantity.

The device converts a color image into a grayscale or binary image, derives an index that indicates the rail-likeness for each pixel in the obtained image corresponding to a railway rail, and specifies a rail on the basis of the index. Here the index is derived on the basis of a brightness gradient between a target pixel and an adjacent pixel.

Patent Literature 1: Japanese Patent Application Publication No. 2018-181254

However, the conventional technique sometimes erroneously detects a rail due to an obstacle such as a shadow around the rail because the search of the rail is narrowed by the brightness gradient.

SUMMARY OF THE INVENTION

Accordingly, an object of at least one aspect of the disclosure is to detect a rail with accuracy even when there is an obstacle such as a shadow near the rail.

A rail detecting device according to an aspect of the disclosure includes: a rail-detection-area designating unit configured to designate a region including two rails as a rail detection area in an image including the two rails; a rail-detection-area dividing unit configured to divide the rail detection area vertically and generate a plurality of rail-candidate detection regions in such a manner that adjacent rail-candidate detection regions of the plurality of rail candidate regions overlap each other; a starting-region rail-starting-point designating unit configured to set a lowest rail-candidate detection region out of the plurality of rail-candidate detection regions as a starting region and designate points at predetermined positions on a lower edge of the starting region as starting points of the two rails; a rail-candidate detecting unit configured to detect a plurality of lines in the starting region as a plurality of rail candidates, the lines being candidates of edges of the two rails; a starting-region-rail assigning unit configured to assign rail candidates whose lowest ends are closest to the corresponding starting points out of the plurality of rail candidates as tentative rail segments; a starting-region-rail disappearance determining unit configured to establish the tentative rail segments as rail segments when distances between the lowest ends of the tentative rail segments and the starting points are smaller than a first threshold and determine whether or not portions of the two rails have been detected based on the rail segments; and a starting-region rail-starting-point redesignating unit configured to set a modified starting region by shifting the starting region upward when the portions of the two rails are not detected based on the rail segments and designate points at predetermined positions on a lower edge of the modified starting region as modified starting points, the modified starting points being starting points of the two rails; wherein, the rail-candidate detecting unit detects a plurality of lines as a plurality of modified rail candidates in the modified starting region, the lines being candidates of edges of the two rails, the starting-region-rail assigning unit assigns modified rail candidates whose lowest ends are closest to the modified starting points out of the plurality of modified rail candidates as tentative modified rail segments, and when distances between the lowest ends of the tentative modified rail segments and the modified starting points are smaller than the first threshold, the starting-region-rail disappearance determining unit establishes the tentative modified rail segments as modified rail segments and determines whether or not portions of the two rails have been detected based on the modified rail segments.

A rail detection method according to an aspect of the disclosure includes: designating a region including two rails as a rail detection area in an image including the two rails; dividing the rail detection area vertically and generating a plurality of rail-candidate detection regions in such a manner that adjacent rail-candidate detection regions of the plurality of rail candidate regions overlap each other; setting a lowest rail-candidate detection region out of the plurality of rail-candidate detection regions as a starting region and designating points at predetermined positions on a lower edge of the starting region as starting points of the two rails; detecting a plurality of lines in the starting region as a plurality of rail candidates, the lines being candidates of edges of the two rails; assigning rail candidates whose lowest ends are closest to the corresponding starting points out of the plurality of rail candidates as tentative rail segments; establishing the tentative rail segments as rail segments when distances between the lowest ends of the tentative rail segments and the starting points are smaller than a first threshold and determining whether or not portions of the two rails have been detected based on the rail segments; setting a modified starting region by shifting the starting region upward when the portions of the two rails are not detected based on the rail segments and designating points at predetermined positions on a lower edge of the modified starting region as modified starting points, the modified starting points being starting points of the two rails; detecting a plurality of lines as a plurality of modified rail candidates in the modified starting region, the lines being candidates of edges of the two rails; assigning modified rail candidates whose lowest ends are closest to the modified starting points out of the plurality of modified rail candidates as tentative modified rail segments; and establishing the tentative modified rail segments as modified rail segments and determining whether or not portions of the two rails have been detected based on the modified rail segments when distances between lowest ends of the tentative modified rail segments and the modified starting points are smaller than the first threshold.

According to at least one aspect of the disclosure, a rail can be detected with accuracy even when there is an obstacle such as a shadow near the rail.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
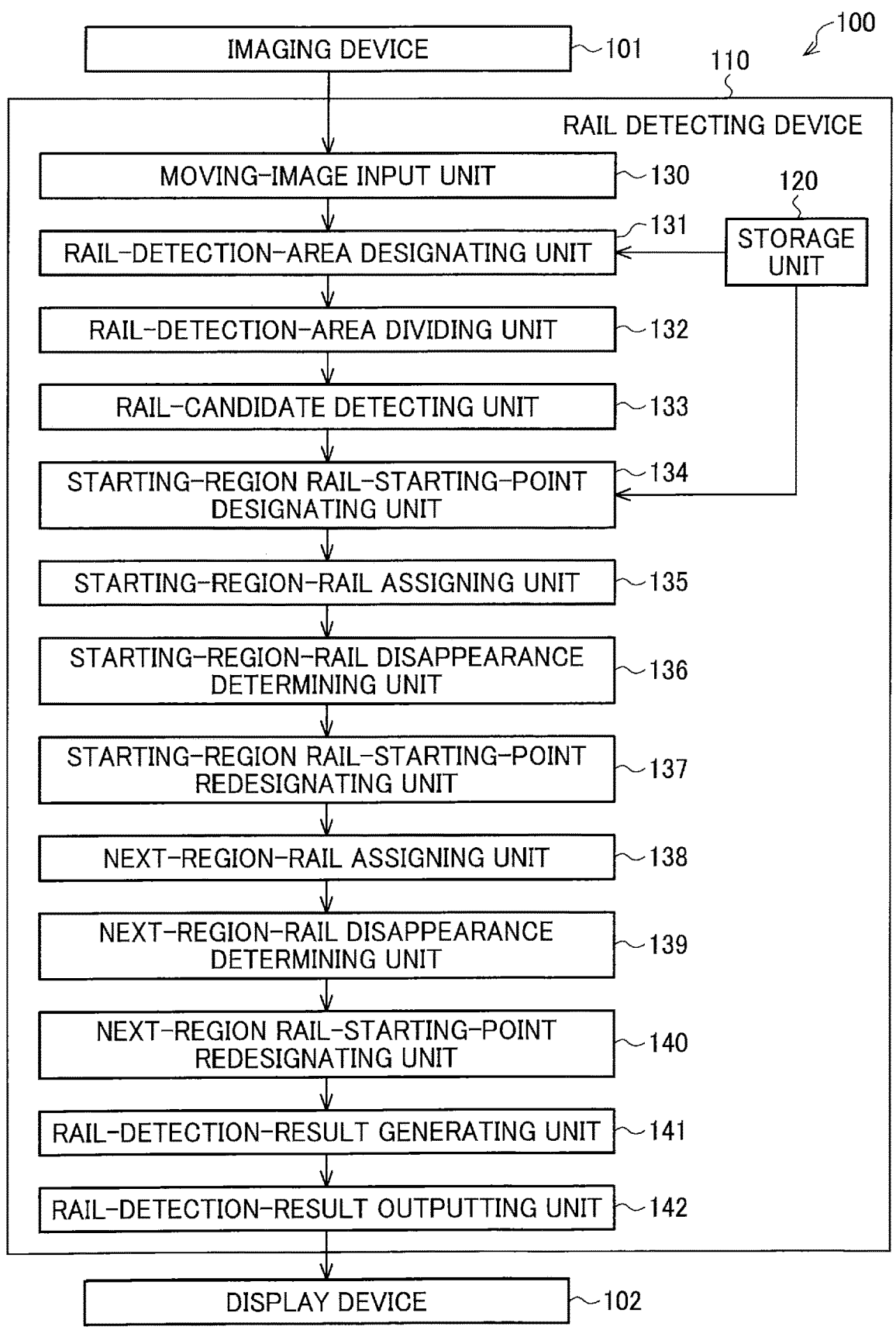
FIG. 1 is a block diagram schematically illustrating the configuration of a rail detection system.

FIG. 1 is a block diagram schematically illustrating a configuration of a rail detection system 100 including a rail detecting device according to an embodiment.

The rail detection system 100 includes an imaging device 101, a display device 102, and a rail detecting device 110.

The imaging device 101 captures moving images and provides moving image data indicating the moving images to the rail detecting device 110. The imaging device 101 is hereinafter also simply referred to as a camera.

The display device 102 displays a screen image indicating detection results obtained by the rail detecting device 110.

The rail detecting device 110 is a device that detects rails in an image indicated by moving image data obtained by the imaging device 101. For example, the rail detecting device 110 detects rail segments, which are portions of rails, in an image and joins these rail segments to detect rails. Specifically, the rail detecting device 110 divides an image containing two rails into multiple regions and detects multiple rail segments that are portions of the two rails in the multiple regions. The rail detecting device 110 then joins these rail segments to detect the two rails.

The rail detecting device 110 includes a storage unit 120, a moving-image input unit 130, a rail-detection-area designating unit 131, a rail-detection-area dividing unit 132, a rail-candidate detecting unit 133, a starting-region rail-starting-point designating unit 134, a starting-region-rail assigning unit 135, a starting-region rail-disappearance determining unit 136, a starting-region rail-starting-point redesignating unit 137, a next-region-rail assigning unit 138, a next-region-rail disappearance determining unit 139, a next-region rail-starting-point redesignating unit 140, a rail-detection-result generating unit 141, and a rail-detection-result output unit 142.

The storage unit 120 stores data necessary for processing by the rail detecting device 110.

For example, the storage unit 120 stores camera installation position information, camera internal parameters, and rail information to be used by the rail-detection-area designating unit 131 and the starting-region rail-starting-point designating unit 134.

Figures 2, 3:
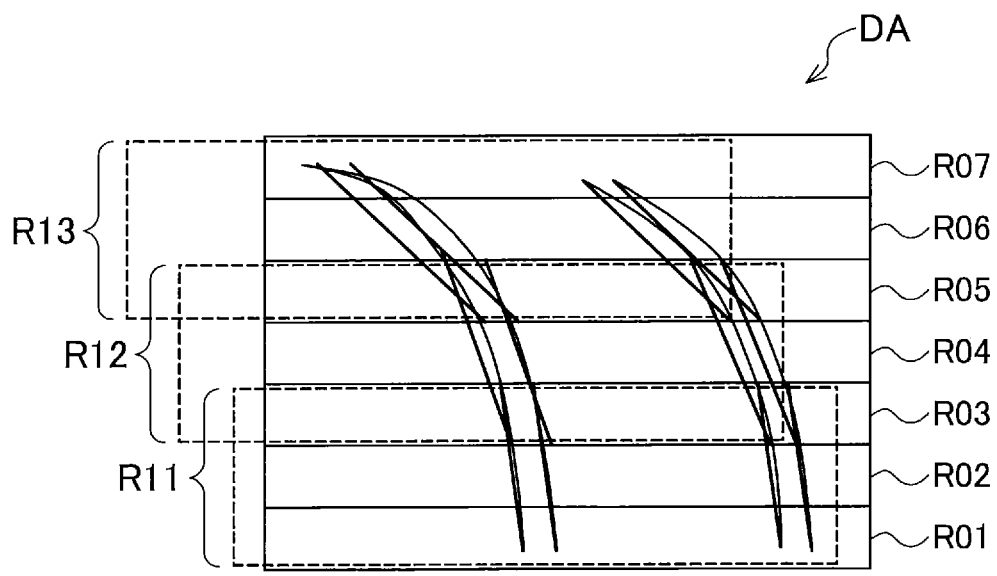
FIG. 2 is a schematic diagram illustrating an example of data stored in a storage unit.
FIG. 3 is a schematic diagram for explaining the process of generating rail-candidate detection regions.

FIG. 2 is a schematic diagram illustrating an example of data stored in the storage unit 120.

As illustrated in FIG. 2, the storage unit 120 stores the camera installation height (vertical) as viewed from the rails, the camera installation width (horizontal) as viewed from the rails, the camera focal length (vertical), the camera focal length (horizontal), the rail gauge, and the rail head width. These values should be acquired in advance.

The camera installation height (vertical) as viewed from the rails and the camera installation width (horizontal) as viewed from the rails are also referred to as camera installation positions, and the camera focal length (vertical) and the camera focal length (horizontal) are also simply referred to as camera focal lengths.

The rail gauge is the width between two rails, and the rail head width is the width of the head of one rail.

Returning to FIG. 1, the moving-image input unit 130 accepts input of moving image data from the imaging device 101.

In an image containing two rails, the rail-detection-area designating unit 131 designates an area containing the two rails as a rail detection area.

For example, the rail-detection-area designating unit 131 designates a rail detection area in a frame image indicated by the moving image data. Since the position of the imaging device 101 is fixed, the area containing the rails in the image is determined to some extent. Therefore, the rail-detection-area designating unit 131 designates a predetermined area of the image as a rail detection area. Since there are no rails at the top portion of the image, for example, due to the position and orientation of the imaging device 101, the rail-detection-area designating unit 131 designates a certain area at the bottom portion of the image as a rail detection area.

The rail-detection-area dividing unit 132 divides the rail detection area designated by the rail-detection-area designating unit 131 to generate multiple rail-candidate detection regions so that every two adjacent regions overlap each other. In this way, the rail detecting device 110 detects rail candidates in each rail-candidate detection region and detects the rails by joining the rail segments established on the basis of the detected rail candidates. Here, the rail-detection-area dividing unit 132 generates the rail-candidate detection regions so that every two adjacent rail-candidate detection regions share an overlapping region.

For example, the rail-detection-area dividing unit 132 divides a rail detection area into multiple regions in the vertical direction. The rail-detection-area dividing unit 132 then generates multiple rail-candidate detection regions that each include at least three contiguous divided regions so that adjacent rail-candidate detection regions share at least one divided region.

FIG. 3 is a schematic diagram for explaining the process of generating rail-candidate detection regions.

First, the rail-detection-area dividing unit 132 divides a rail detection area DA of a frame image into a predetermined number of divided regions R01 to R07 in the vertical direction. Here, each of the divided regions R01 to R07 is of the same size.

The rail-detection-area dividing unit 132 then generates a rail-candidate detection region from multiple contiguous divided regions.

In FIG. 3, the rail-detection-area dividing unit 132 generates a rail-candidate detection region R11 from the three divided regions R01 to R03, a rail-candidate detection region R12 from the three divided regions R03 to R05, and a rail-candidate detection region R13 from the three divided regions R05 to R07.

Here, the rail-detection-area dividing unit 132 generates rail-candidate detection regions so that every two adjacent rail-candidate detection regions share an overlapping region. For example, in FIG. 3, the rail-candidate detection regions R11 and R12 share the divided region R03. The rail-candidate detection regions R12 and R13 share the divided region R05.

As described above, the rail-detection-area dividing unit 132 divides the rail detection area into at least six portions to generate at least six divided regions. It is desirable that the rail-detection-area dividing unit 132 generate at least two rail-candidate detection regions consisting of at least three divided regions so that the rail-candidate detection regions share at least one divided region.

Returning to FIG. 1, the rail-candidate detecting unit 133 detects rail candidates in each of the rail-candidate detection regions generated by the rail-detection-area dividing unit 132. A rail candidate is a line detected through, for example, a linear detection method such as Hough transformation or a line detection method such as a curve detection method using spline interpolation.

This is described in detail, for example, in the following literature.

R. O. Duda and P. E. Hart, "Use of the Hough transformation to detect lines and curves in pictures," Comm. Assoc. Comput. Mar. 15, 1972, pp. 11-15.

For example, the rail-candidate detecting unit 133 detects, as multiple rail candidates, multiple lines that are candidates of the edges of two rails in rail-candidate detection regions.

The starting-region rail-starting-point designating unit 134 sets the lowest positioned rail-candidate detection region out of the rail-candidate detection regions generated by the rail-detection-area dividing unit 132 as a starting region.

The starting-region rail-starting-point designating unit 134 designates four points as the starting points of the rails in the starting region on the basis of the camera installation position, the camera focal length, the rail gauge, and the rail head width stored in the storage unit 120.

By using the information stored in the storage unit 120, the xy coordinates of a target in an image can be calculated by the following equations (1) and (2).

$$\text{Target position y coordinate(pixel)} = \text{vertical angle of view}/2 - ((\text{target height} - \text{camera height})/\text{target distance}) \times \text{focal length(vertical)} \quad (1)$$

$$\text{Target position x coordinate(pixel)} = \text{horizontal angle of view}/2 + ((\text{target horizontal position} - \text{camera center horizontal position})/\text{target distance}) \times \text{focal length(horizontal)} \quad (2)$$

The variables used in these equations when the target is a rail will now be described.

Figure 4:
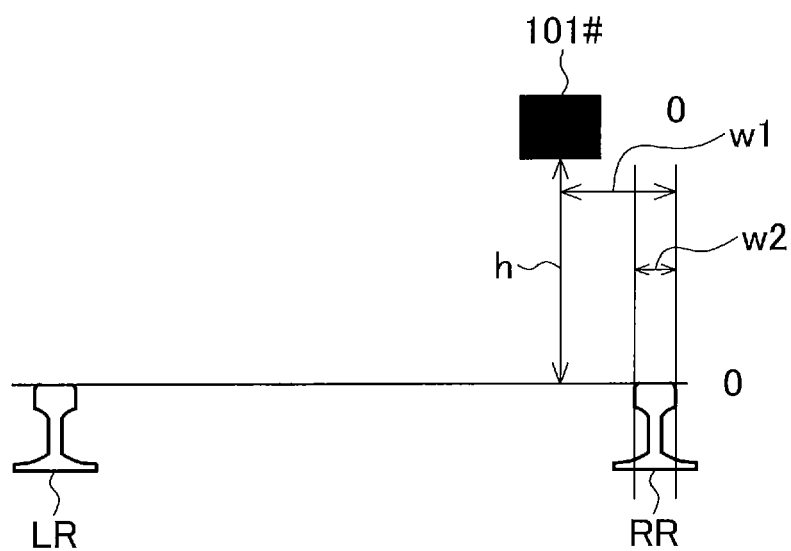
FIG. 4 is a schematic diagram for explaining the relationship between rails and a camera.

FIG. 4 is a schematic diagram for explaining the relationship between the rails and the camera.

FIG. 4 illustrates a left rail LR, a right rail RR, and a camera 101# serving as the imaging device 101.

The camera height h in FIG. 4 is the camera installation height (vertical) as viewed from the rails stored in the storage unit 120.

The target height is the height of the rails, and in this case, is "0" because the height of the camera 101# is determined with reference to the heads of the rails.

A camera center horizontal position w1 is the camera installation width (horizontal) as viewed from the rails stored in the storage unit 120.

A target horizontal position w2 is the rail head width stored in the storage unit 120.

Since the y-coordinate (pixel) at the bottom of the image is known, the target distance can be calculated by the equation (1) when the left edge of the left rail is the target. The target position x-coordinate (pixel) can be calculated by the equation (2).

Since the rail gauge and rail head width are fixed and known, the x- and y-coordinates of the four points that are the starting points of the rails in the starting region can be calculated.

The calculation of starting points is described in detail, for example, in the following literature.

Gideon P. Stein, "Vision-based ACC with a Single Camera: Bounds on Range and Range Rate Accuracy," Mobile-Eye 2003 IEEE, 2003.

When a moving image is input, the displacement of the rails between frames is infinitely small; thus, the starting-region rail-starting-point designating unit 134 may set the starting points in the starting region of a previous frame as the starting points of the next frame instead of determining the starting points in the starting region on the basis of the information stored in the storage unit 120 for each frame.

That is, the data stored in the storage unit 120 is information acquired in advance, and if the angle of view is also fixed, the starting-region rail-starting-point designating unit 134 designates points at predetermined positions on the lower edge of the starting region as the starting points of the two rails.

Returning to FIG. 1, the starting-region-rail assigning unit 135 assigns rail candidates whose lowest ends are closest to the corresponding starting points designated by the starting-region rail-starting-point designating unit 134 as tentative rail segments in the starting region.

When the distance between a lowest end of a tentative rail segment and a starting point is smaller than a first threshold, the starting-region rail-disappearance determining unit 136 establishes the tentative rail segment as a rail segment. The starting-region rail-disappearance determining unit 136 then determines whether or not both portions of the two rails have been detected on the basis of the established rail segments.

Specifically, the starting-region rail-disappearance determining unit 136 determines whether or not the tentative rail segments in the starting region assigned by the starting-region-rail assigning unit 135 satisfy a disappearance condition.

Figure 5:
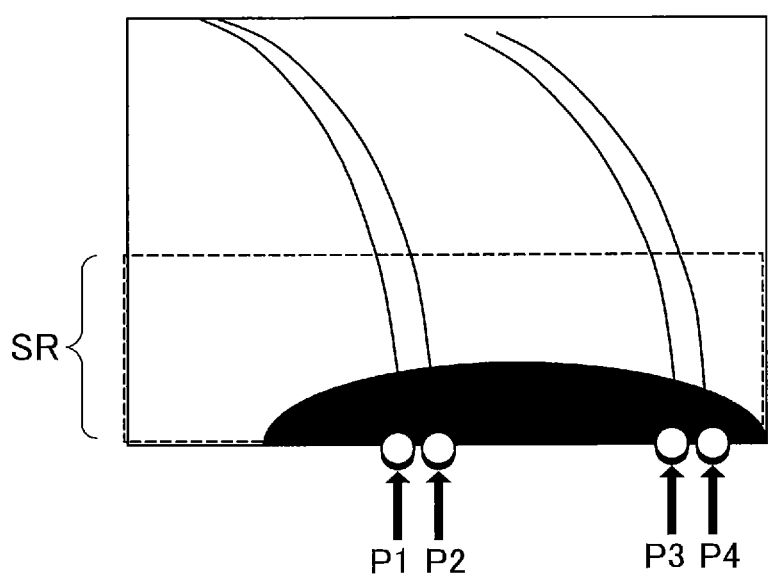
FIG. 5 is a schematic diagram for explaining an example in which rails disappear in a starting region.

FIG. 5 is a schematic diagram for explaining an example in which rails disappear in a starting region.

As illustrated in FIG. 5, starting points P1 to P4 designated by the starting-region rail-starting-point designating unit 134 in a starting region SR may be hidden by an obstacle such as a vehicle body or a shadow depending on the camera installation position.

In such a case, the starting-region rail-disappearance determining unit 136 determines that the tentative rail segments in the starting region SR have disappeared.

Figure 6:
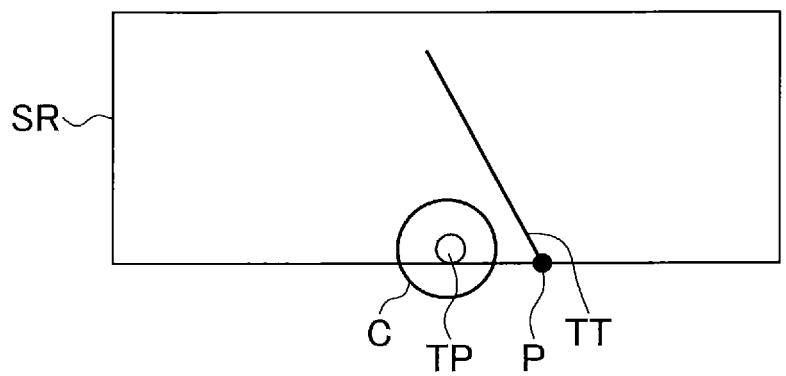
FIG. 6 is a schematic diagram for explaining a process example of determining whether or not a tentative rail segment in the starting region has disappeared.

FIG. 6 is a schematic diagram for explaining a process example of determining whether or not a tentative rail segment in the starting region has disappeared.

First, the starting-region rail-disappearance determining unit 136 selects a starting point as a target starting point TP one by one from the four starting points P1 to P4.

Then, a tentative rail segment that is a rail candidate closest to the target starting point TP is defined as a target tentative rail segment TT.

Next, the starting-region rail-disappearance determining unit 136 calculates the distance between the target starting point TP and the target tentative rail segment TT by the following equation (3).

$$\text{Distance} = |(\text{x-coordinate of lowest end of target tentative rail segment}) - (\text{x-coordinate of target starting point})| \quad (3)$$

In FIG. 6, the x-coordinate of the lowest end of the target tentative rail segment is the x-coordinate of the intersection P of the lowest edge of the starting region SR and the target tentative rail segment TT.

Here, the distance between the starting point and the lowest end of the target tentative rail segment is simply calculated by using only the x-coordinate, but the present embodiment is not limited to such an example. For example, the x- and y-coordinates may be used to calculate the distance between the two points.

When the distance calculated as described above is equal to or greater than a predetermined threshold (first threshold), the starting-region rail-disappearance determining unit 136 does not establish the target tentative rail segment as a rail segment at the target starting point. The threshold here may be determined on the basis of the width of the rail head. For example, by setting the threshold to the rail head width, it can be determined that the rail segment is not appropriately detected when the calculated distance is equal to or greater than this width.

This means that, for example, a target tentative rail segment cannot be a rail segment when the lowest end of the target tentative rail segment TT does not reside inside a circle C representing the threshold and being centered on the target starting point TP, as illustrated in FIG. 6.

The starting-region rail-disappearance determining unit 136 then determines that the rails have disappeared when the rail segments established on the basis of the four starting points P1 to P4 satisfy Condition 1 or 2 below. Conditions 1 and 2 are disappearance conditions.

Condition 1: there is no more than one rail segment, that is, the number of rail segments is zero or one.

Condition 2: when there are two rail segments, the distance between the x-coordinates of the lowest ends of the rail segments should be smaller than a predetermined threshold (third threshold).

Here, the threshold (third threshold) of Condition 2 should be a value that can be used to determine whether or not two rails or right and left rails are detected on the basis of the rail gauge. For example, the threshold may be the rail gauge or a value smaller than the rail gauge by a predetermined length.

As a result, when there are three or more rail segments, that is, when the number of rail segments is three or four, the right and left rails have been detected, and thus it is determined that the rails have not disappeared. In such a case, it can be determined that neither Condition 1 nor Condition 2 is satisfied.

Returning to FIG. 1, the starting-region rail-starting-point redesignating unit 137 designates a new starting point by shifting the starting region to the next rail-candidate detection region when the starting-region rail-disappearance determining unit 136 determines that the rails have disappeared.

For example, the starting-region rail-starting-point redesignating unit 137 shifts the starting region upward when both portions of the two rails are not detected on the basis of rail segments. Here, the starting region shifted upward is also referred to as a modified starting region. The starting-region rail-starting-point redesignating unit 137 then designates points at predetermined positions on the lower edge of the modified starting region as starting points of the two rails. The starting points designated here are also referred to as modified starting points.

Specifically, the starting-region rail-starting-point redesignating unit 137 sets a rail-candidate detection region directly above the starting region as a modified starting region.

Figure 7:
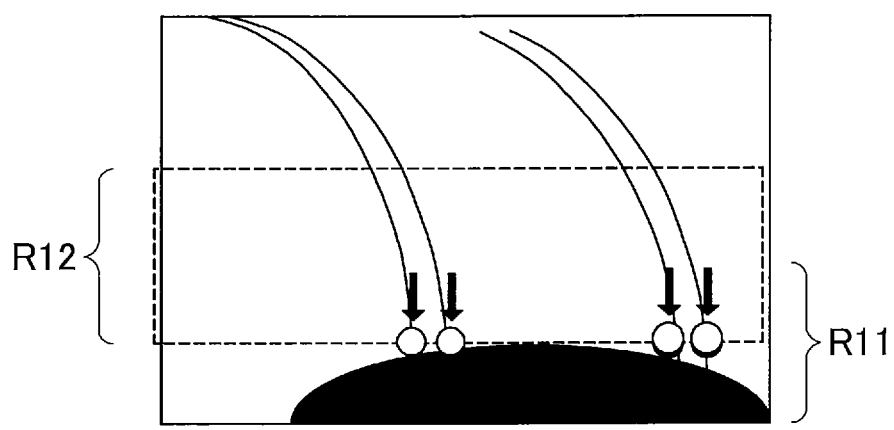
FIG. 7 is a schematic diagram for explaining the process of redesignating starting points in a starting region.

FIG. 7 is a schematic diagram for explaining the process of redesignating starting points in a starting region.

For example, when the rails are determined to have disappeared in the rail-candidate detection region R11 that has been designated as a starting region SR, the starting-region rail-starting-point redesignating unit 137 designates the next rail-candidate detection region R12 as the starting region.

The starting-region rail-starting-point redesignating unit 137 then designates four starting points in the designated starting region, like the starting-region rail-starting-point designating unit 134.

When the modified starting points are designated, the rail-candidate detecting unit 133 detects, as multiple rail candidates, multiple lines that are candidates of the edges of two rails in the modified starting region. The rail candidates detected here are also referred to as modified rail candidates.

The starting-region-rail assigning unit 135 then assigns a modified rail candidate whose lowest end is closest to the modified starting point out of the modified rail candidates as a rail segment. The rail segment assigned here is also referred to as a tentative modified rail segment.

When the distance between the lowest end of the tentative modified rail segment and the modified starting point is smaller than a first threshold, the starting-region rail-disappearance determining unit 136 establishes the tentative modified rail segment as a rail segment. The rail segment established here is also referred to as a modified rail segment.

The starting-region rail-disappearance determining unit 136 further determines whether or not both portions of the two rails have been detected on the basis of modified rail segments.

As described above, when it is determined that the rails have disappeared, the starting-region rail-starting-point redesignating unit 137 shifts the starting region sequentially from the bottom to the top along the multiple rail-candidate detection regions. In this way, the influence of an obstacle can be avoided.

When rail segments are established in the starting region, the rail-candidate detecting unit 133 defines the starting region or the modified starting region as a previous region and the rail-candidate detection region directly above the previous region as a next region. The rail-candidate detecting unit 133 then detects, as multiple rail candidates, multiple lines that are candidates of the edges of the two rails in the new next region. The rail candidates detected here are also referred to as next rail candidates.

When rail segments are established in the next region, the rail-candidate detecting unit 133 further defines the next region as a previous region and defines the rail-candidate detection region directly above the next region, i.e., a rail-candidate detection region that overlaps the next region and has not been subjected to establishment of rail segments as a new next region. The rail-candidate detecting unit 133 then detects, as multiple rail candidates, multiple lines that are candidates of the edges of the two rails in the new next region.

The next-region-rail assigning unit 138 assigns rail candidates in a next region.

For example, the next-region-rail assigning unit 138 designates the intersection of the lower edge of the next region and a rail segment or a modified rail segment as a starting point of a rail. The starting point designated here is also referred to as a next starting point.

The next-region-rail assigning unit 138 then defines next rail candidates whose tilt differs from the tilt of the rail segment or the modified rail segment by less than a second threshold out of multiple next rail candidates as selected next rail candidates.

Moreover, the next-region-rail assigning unit 138 assigns the selected next rail candidate whose lowest end is closest to the next starting point out of the selected next rail candidates as a tentative next rail segment.

Specifically, the next-region-rail assigning unit 138 narrows down the rail candidates in the next region by comparing the difference in the tilt between the rail candidates detected in the next region and the rail segment established in the previous region by using a threshold. The rail candidates narrowed down here are also referred to as selected rail candidates or selected next rail candidates.

For example, the next-region-rail assigning unit 138 narrows down the rail candidates by using the following equation (4) to calculate the tilt difference or the difference in tilt between a straight line corresponding to a rail segment in the previous region and a straight line corresponding to a rail candidate and comparing the difference with a threshold.

$$\text{Tilt difference} = |(\text{tilt of rail segment in previous region}) - (\text{tilt of rail candidate in next region})| \quad (4)$$

Figure 8:
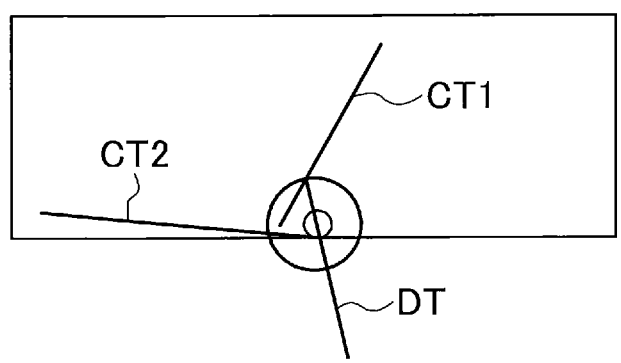
FIG. 8 is a schematic diagram for explaining the process of narrowing down rail candidates.

FIG. 8 is a schematic diagram for explaining the process of narrowing down rail candidates.

In FIG. 8, the symbol DT represents a rail segment established in a previous region. The symbols CT1 and CT2 represent rail candidates detected in a next region.

In FIG. 8, the rail candidates CT1 and CT2 are excluded from selected rail candidates or selected next rail candidates because the difference in tilt between each of the rail candidates CT1 and CT2 and the rail segment DT is equal to or greater than a threshold. The threshold at this time may be calculated from the maximum curvature of a rail (radius R: 160 m).

The next-region-rail assigning unit 138 then defines the intersection of the rail segment established in the previous region and the lowest edge of the next region and defines the rail candidate whose lowest end is closest to the starting point out of the narrowed-down rail candidates as a tentative rail segment.

Figure 9:
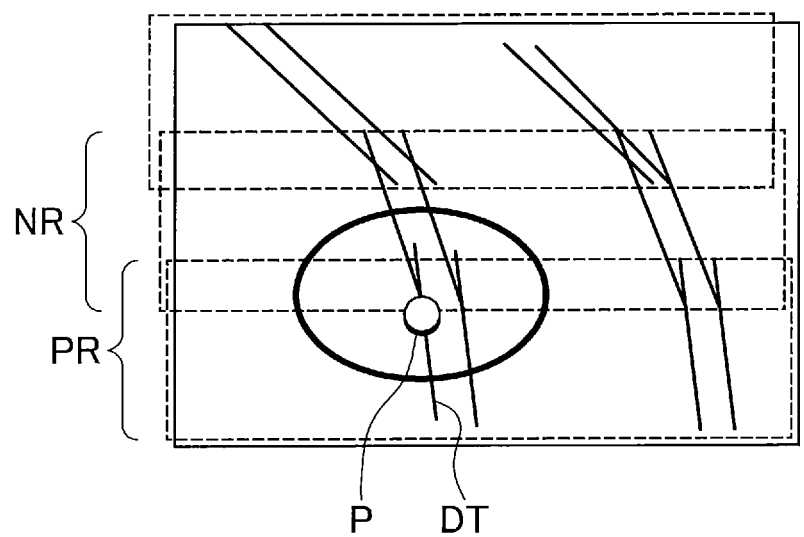
FIG. 9 is a schematic diagram for explaining the process of specifying starting points in a next region.

FIG. 9 is a schematic diagram for explaining the process of specifying a starting point in a next region.

As illustrated in FIG. 9, an intersection P of a rail segment DT established in a previous region RT and the lowest end of a next region NR is specified as a starting point.

Returning to FIG. 1, when the distance between the lowest end of a tentative next rail segment and a next starting point is smaller than a first threshold, the next-region-rail disappearance determining unit 139 establishes the tentative next rail segment as a rail segment. The rail segment established here is also referred to as a next rail segment.

The next-region-rail disappearance determining unit 139 then determines whether or not both portions of the two rails have been detected on the basis of next rail segments.

For example, the next-region-rail disappearance determining unit 139 determines whether or not a tentative rail segment established by the next-region-rail assigning unit 138 satisfies a disappearance condition.

Figure 10:
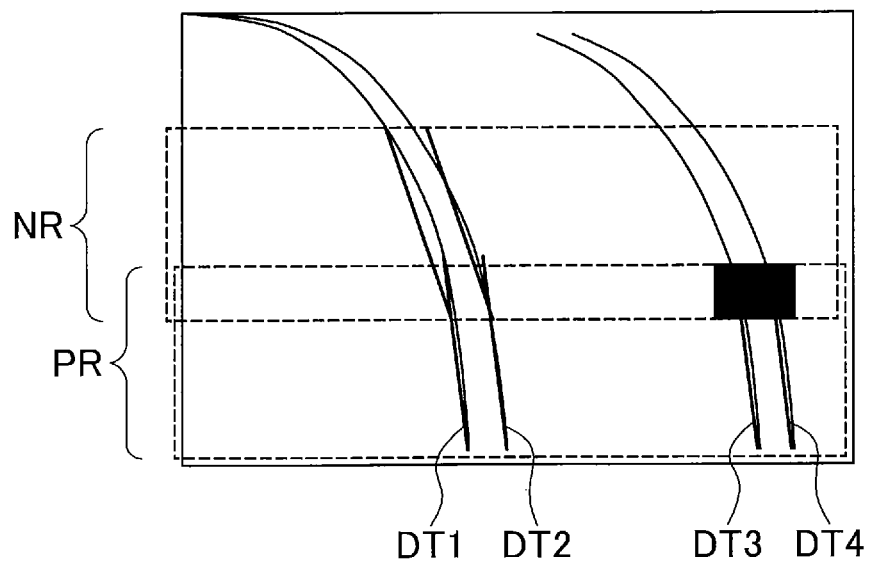
FIG. 10 is a schematic diagram for explaining an example in which rails in a next region disappear.

FIG. 10 is a schematic diagram for explaining an example in which rails in a next region disappear.

As illustrated in FIG. 10, when intersections of rail segments DT1 to DT4 established in a previous region PR and the lowest edge of a next region NR are defined as starting points, the starting points may be hidden by a shadow or an obstacle such as electrical equipment around the rails. As for the disappearance condition, for example, whether or not a tentative rail segment passes through a predetermined threshold range with respect to a starting point may be determined on the basis of a difference in distance, like the starting-region rail-disappearance determining unit 136.

Returning to FIG. 1, the next-region rail-starting-point redesignating unit 140 shifts the next region downward when both portions of the two rails are not detected on the basis of next rail segments. Here, a shifted next region is also referred to as a modified next region. For example, the next-region rail-starting-point redesignating unit 140 may set a modified next region so as to include a divided region directly below a next region. In such a case, the rail-detection-area dividing unit 132 sets the rail-candidate detection region again because one rail-candidate detection region shifts downward by a distance corresponding to one divided region.

The next-region rail-starting-point redesignating unit 140 then designates the intersection of the lower edge of the modified next region and a rail segment or a modified rail segment as a starting point. The starting point designated here is also referred to as a modified next starting point.

For example, when the next-region-rail disappearance determining unit 139 determines that the rails have disappeared, the next-region rail-starting-point redesignating unit 140 resets the next region so that the region shared by the next region and the previous region increases and also resets the starting point.

Figure 11:
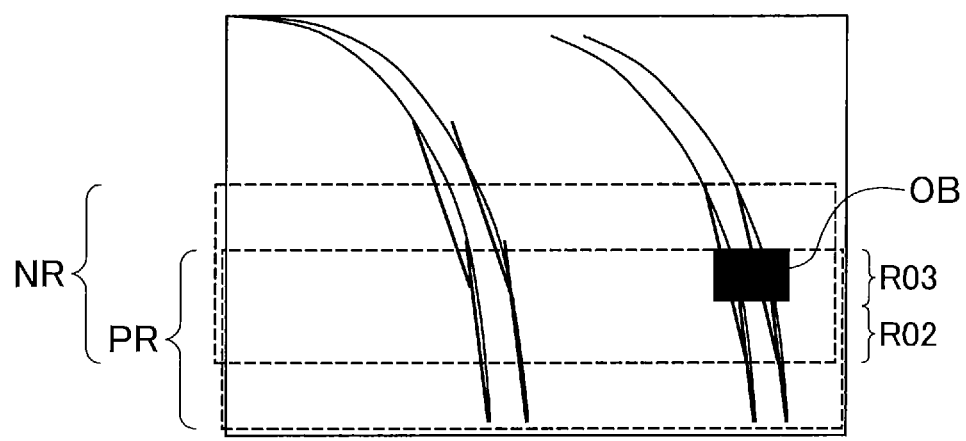
FIG. 11 is a schematic diagram for explaining the process of increasing a region shared by a next region and a previous region.

FIG. 11 is a schematic diagram for explaining the process of increasing the region shared by a next region and a previous region.

As illustrated in FIG. 11, a next region NR is shifted toward a previous region PR by a distance corresponding to one divided region (a divided region R02 in FIG. 11) with respect to the previous region PR. In this way, even when there is an obstacle OB in the region shared by the previous region PR and the next region NR, a starting point can be designated in the next region with the obstacle OB avoided.

Returning to FIG. 1, when a modified next region and a modified next starting point are established by the next-region rail-starting-point redesignating unit 140, the rail-candidate detecting unit 133 detects, as multiple rail candidates, multiple lines that are candidates of the edges of two rails in a modified next region as rail candidates. The rail candidates detected here are also referred to as modified next rail candidates.

The next-region-rail assigning unit 138 selects next rail candidates whose tilt differs from the tilt of a rail segment or a modified rail segment by less than a second threshold out of multiple modified next rail candidates as selected next rail candidates. The selected rail candidates selected here are also referred to as selected modified next rail candidates.

The next-region-rail assigning unit 138 further assigns a selected modified next rail candidate whose lowest end is closest to the modified next starting point out of the selected modified next rail candidates as a tentative rail segment. The tentative rail segment assigned here is also referred to as a tentative modified next rail segment.

When the distance between the lowest end of the tentative modified next rail segment and the modified next starting point is less than a first threshold, the next-region-rail disappearance determining unit 139 establishes the tentative modified next rail segment as a rail segment. The rail segment established here is also referred to as a modified next rail segment.

The next-region-rail disappearance determining unit 139 then determines whether or not both portions of two rails have been detected on the basis of the modified next rail segment.

The rail-detection-result generating unit 141 detects rails by joining the rail segments detected as above and generates a rail detection result indicating the detected rails.

The rail-detection-result output unit 142 outputs the rail detection result to the display device 102.

Figure 12:
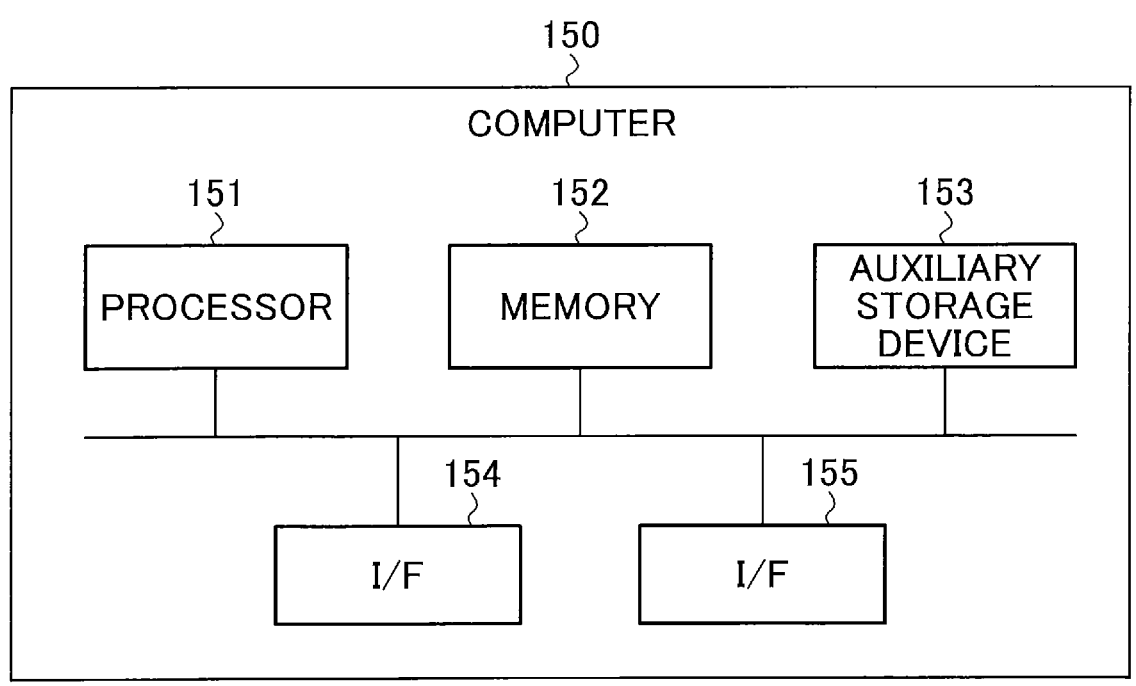
FIG. 12 is a block diagram schematically illustrating the hardware configuration of a rail detecting device.

FIG. 12 is a block diagram schematically illustrating a hardware configuration of the rail detecting device 110.

The rail detecting device 110 can be implemented by a computer 150 including a processor 151 such as a central processing unit (CPU), a memory 152, an auxiliary storage device 153 such as a hard disc drive (HDD) or a solid-state drive (SSD), an interface (I/F) 154, and an I/F 155.

For example, the rail-detection-area designating unit 131, the rail-detection-area dividing unit 132, the rail-candidate detecting unit 133, the starting-region rail-starting-point designating unit 134, the starting-region-rail assigning unit 135, the starting-region rail-disappearance determining unit 136, the starting-region rail-starting-point redesignating unit 137, the next-region-rail assigning unit 138, the next-region-rail disappearance determining unit 139, the next-region rail-starting-point redesignating unit 140, and the rail-detection-result generating unit 141 can be implemented by the processor 151 loading programs stored in the auxiliary storage device 153 to the memory 152 and executing these loaded programs.

The moving-image input unit 130 can be implemented by the I/F 154. The I/F 154 is, for example, an interface for exchanging data with the imaging device 101.

The rail-detection-result output unit 142 can be implemented by the I/F 155. The I/F 155 is, for example, an interface for exchanging data with the display device 102.

The storage unit 120 can be implemented by the auxiliary storage device 153.

The imaging device 101 can be implemented by a camera capable of acquiring moving images, and the display device 102 can be implemented by a display capable of displaying moving images.

Figure 13:
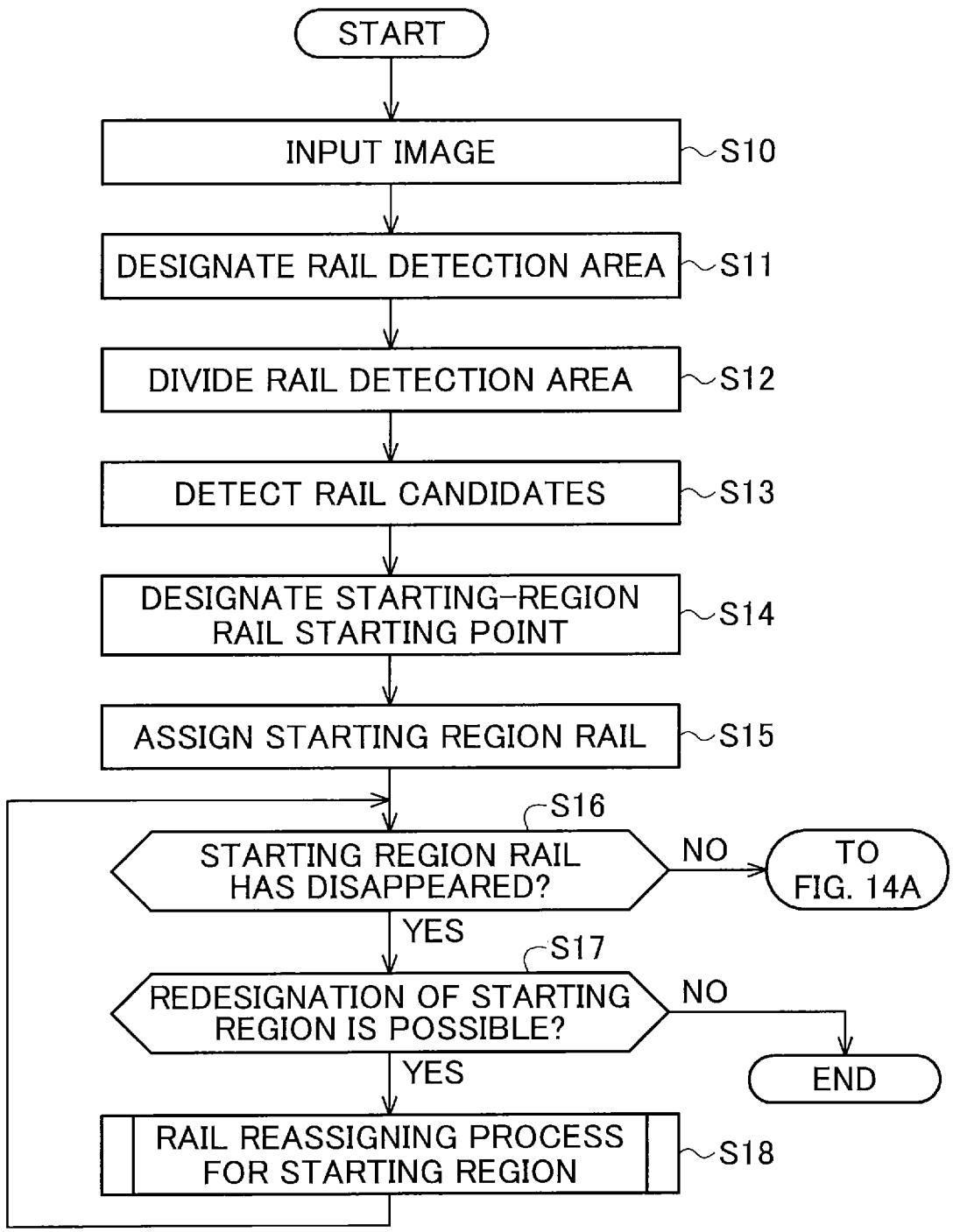
FIG. 13 is a first flowchart illustrating the process of detecting rails in a single frame image.
Figure 14:
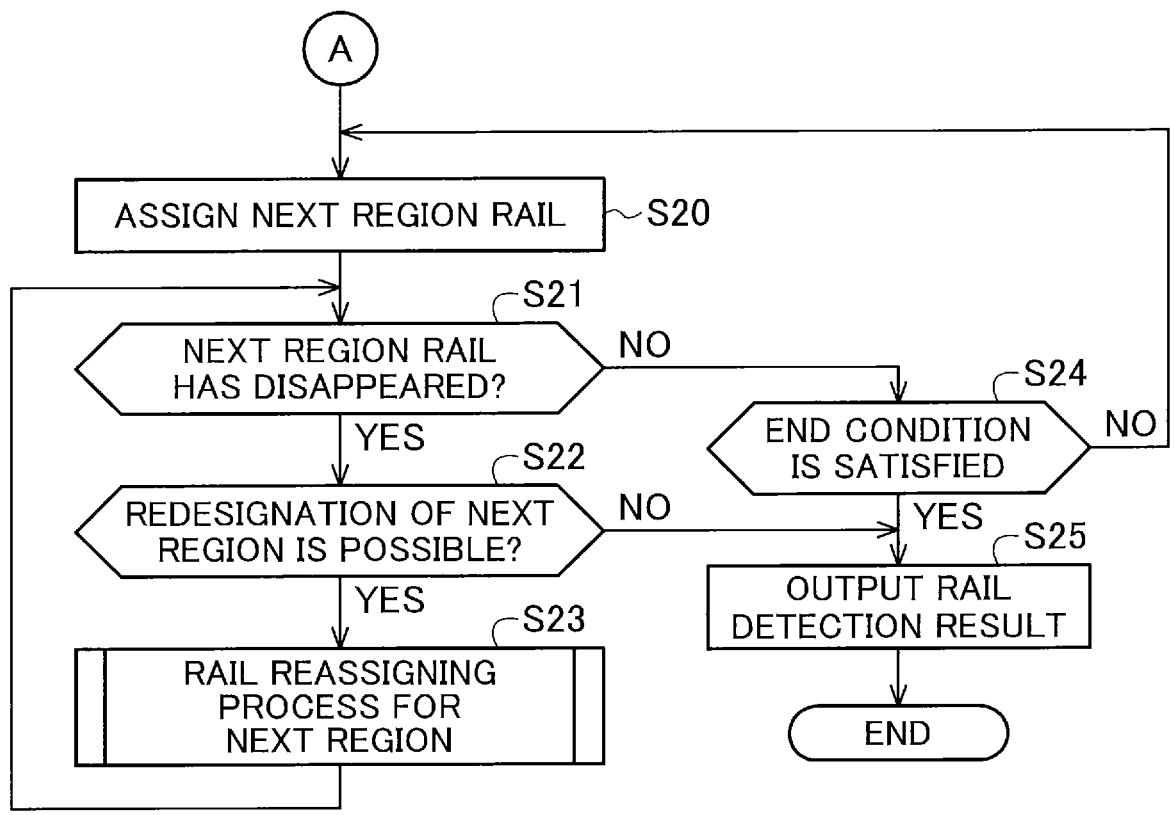
FIG. 14 is a second flowchart illustrating the process of detecting rails in a single frame image.

FIGS. 13 and 14 are flowcharts illustrating the process of detecting rails in a single frame image.

When a moving image is input, the following process is repeated.

First, the moving-image input unit 130 accepts input of a frame image (step S10).

Next, the rail-detection-area designating unit 131 designates a rail detection area in the input image (step S11).

The rail-detection-area dividing unit 132 divides the rail detection area into multiple divided regions and generates rail-candidate detection regions from a predetermined number of divided regions (step S12).

The rail-candidate detecting unit 133 detects rail candidates in the generated rail-candidate detection regions (step S13).

Next, the starting-region rail-starting-point designating unit 134 designates starting points of rails in a starting region (step S14).

The starting-region-rail assigning unit 135 assigns a rail candidate closest to a designated starting point as a tentative rail segment in the starting region (step S15).

The starting-region rail-disappearance determining unit 136 establishes a tentative rail segment that satisfies a rail condition as a rail segment out of the tentative rail segments and determines whether or not the rails have disappeared (step S16). If the rails have disappeared (YES in step S16), the process proceeds to step S17, and if the rails have not disappeared, the process proceeds to step S20 in FIG. 14.

In step S17, the starting-region rail-starting-point redesignating unit 137 determines whether or not it is possible to redesignate the starting region and the starting points. For example, when the starting region is the top rail-candidate detection region in the rail detection area, it is determined that redesignation of the starting region and the starting points is impossible. If redesignation is possible (Yes in step 317), the process proceeds to step S18, and if redesignation is impossible (No in step S17), the process ends.

In step S18, the rail-candidate detecting unit 133, the starting-region-rail assigning unit 135, and the starting-region rail-starting-point redesignating unit 137 execute rail reassigning process for the starting region. This process will be explained below in detail with reference to FIG. 17.

In step S20 in FIG. 14, the next-region-rail assigning unit 138 specifies a previous region and a next region, assigns rail candidates in the next region, and specifies a tentative rail segment in the next region.

Next, the next-region-rail disappearance determining unit 139 specifies a tentative rail segment that satisfies a rail condition in the next region and determines whether or not the rails have disappeared in the next region on the basis of the tentative rail segment (step S21). If the rails have disappeared (Yes in step S21), the process proceeds to step S22, and if the rails have not disappeared (No in step S21), the process proceeds to step S24.

In step S22, the next-region rail-starting-point redesignating unit 140 determines whether or not it is possible to redesignate the next region and the starting point. For example, when shifting the next region causes the next region to overlap the previous region, it is determined that redesignation of the next region and the starting point is impossible. If redesignation is possible (Yes in step S22), the process proceeds to step S23, and if redesignation is impossible (No in step S22), the process proceeds to step S25.

In step S23, the rail-candidate detecting unit 133, the next-region-rail assigning unit 138, the next-region-rail disappearance determining unit 139, and the next-region rail-starting-point redesignating unit 140 execute a rail redesignation process in the next region. This process will be explained below in detail with reference to FIG. 20.

In step S24, the rail-detection-result generating unit 141 determines whether or not an end condition is satisfied. The end condition here is that the rail-candidate detection region at the top of the rail detection area is designated as a next region. If the end condition is satisfied (Yes in step S24), the process proceeds to step S25, and if the end condition is not satisfied (No in step S24), the process returns to step S20.

In the flowcharts described above, the rail-candidate detecting unit 133 detects rail candidates after the rail-detection-area dividing unit 132 divides the rail detection area, but the present embodiment is not limited to such an example. For example, the rail-candidate detecting unit 133 may detect rail candidates in a starting region or a next region after the starting region or the next region has been set.

Figure 15:
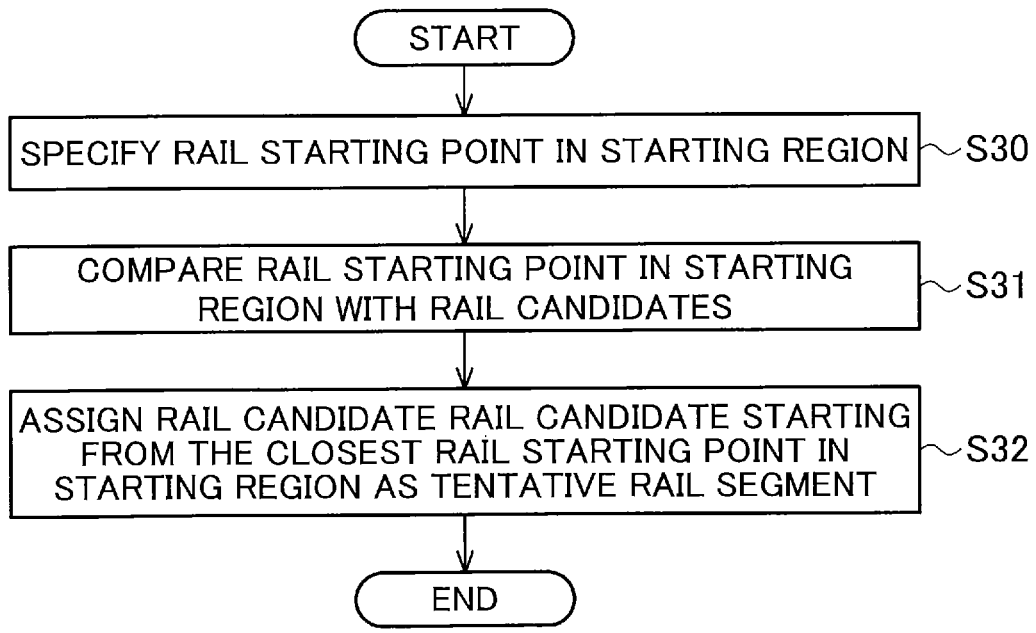
FIG. 15 is a flowchart illustrating the processing by a starting-region-rail assigning unit.

FIG. 15 is a flowchart illustrating the processing by the starting-region-rail assigning unit 135.

The starting-region-rail assigning unit 135 specifies starting points in a starting region designated by the starting-region rail-starting-point designating unit 134 in the starting region (step S30).

Next, the starting-region-rail assigning unit 135 compares the starting points in the starting region with the rail candidates in the starting region (step S31).

The starting-region-rail assigning unit 135 then assigns the rail candidate closest to a starting point in the starting region as a tentative rail segment (step S32).

Figure 16:
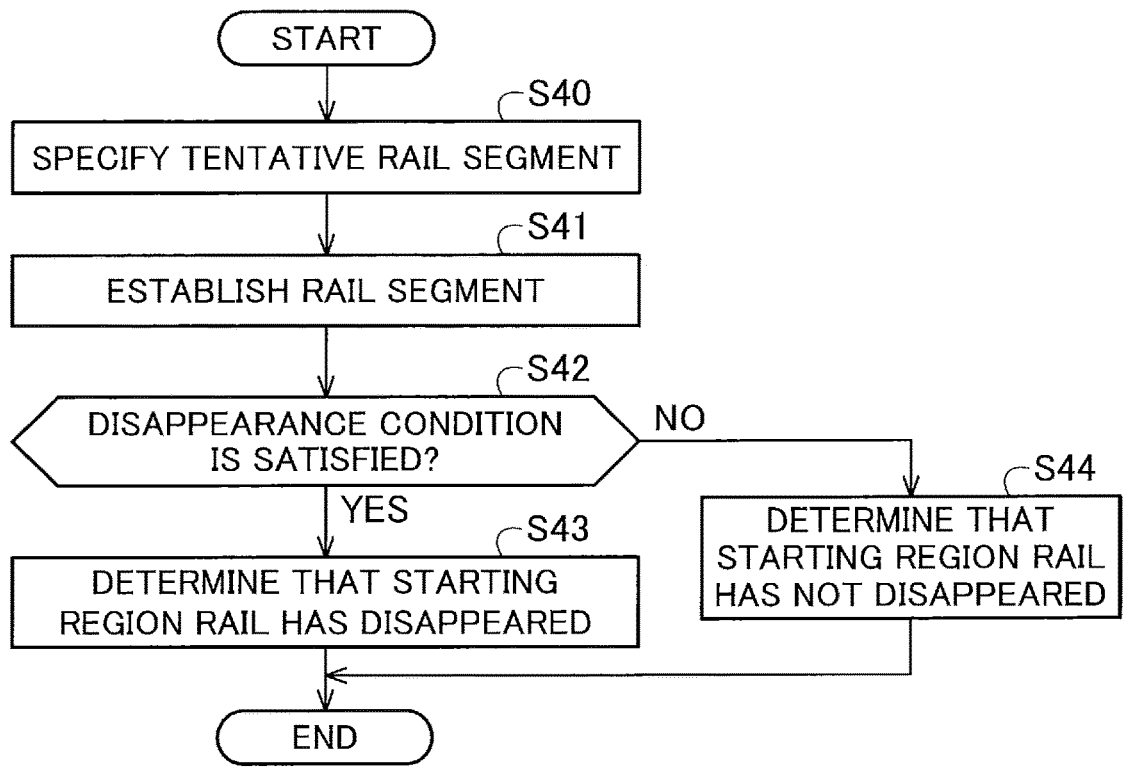
FIG. 16 is a flowchart illustrating the processing by a starting-region-rail disappearance determining unit.

FIG. 16 is a flowchart illustrating the processing by the starting-region rail-disappearance determining unit 136.

First, the starting-region rail-disappearance determining unit 136 specifies tentative rail segments assigned by the starting-region-rail assigning unit 135 in a starting region (step S40).

The starting-region rail-disappearance determining unit 136 determines whether or not the distance between a starting point and the lowest end of a tentative rail segment corresponding to the starting point is equal to or greater than a predetermined threshold to specify a tentative rail segment whose distance is smaller than the threshold as a rail segment (step S41).

Next, the starting-region rail-disappearance determining unit 136 determines whether or not a disappearance condition is satisfied (step S42). If the disappearance condition is satisfied (Yes in step S42), the process proceeds to step S43, and if the disappearance condition is not satisfied (No in step S42), the process proceeds to step S44.

In step S43, the starting-region rail-disappearance determining unit 136 determines that the rails have disappeared in the starting region.

In step S44, the starting-region rail-disappearance determining unit 136 determines that the rails have not disappeared in the starting region.

Figure 17:
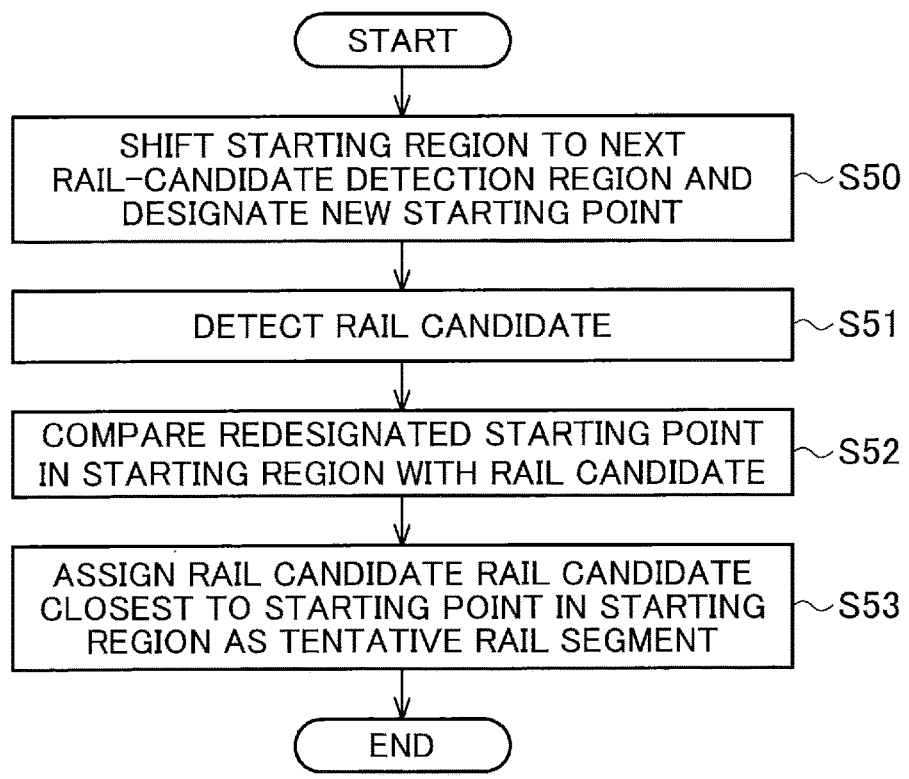
FIG. 17 is a flowchart illustrating the process of rail reassignment in a starting region.

FIG. 17 is a flowchart illustrating the process of rail reassignment in a starting region.

First, the starting-region rail-starting-point redesignating unit 137 shifts the starting region to a rail-candidate detection region directly above the starting region and designates new starting points in the new starting region (step S50).

Next, the rail-candidate detecting unit 133 detects rail candidates in the new starting region (step S51).

Next, the starting-region-rail assigning unit 135 compares the redesignated starting points in the new starting region and the rail candidates in the new starting region (step S52).

The starting-region-rail assigning unit 135 then assigns a rail candidate that extends upward from a point closest to a starting point in the starting region as a tentative rail segment (step S53).

Figure 18:
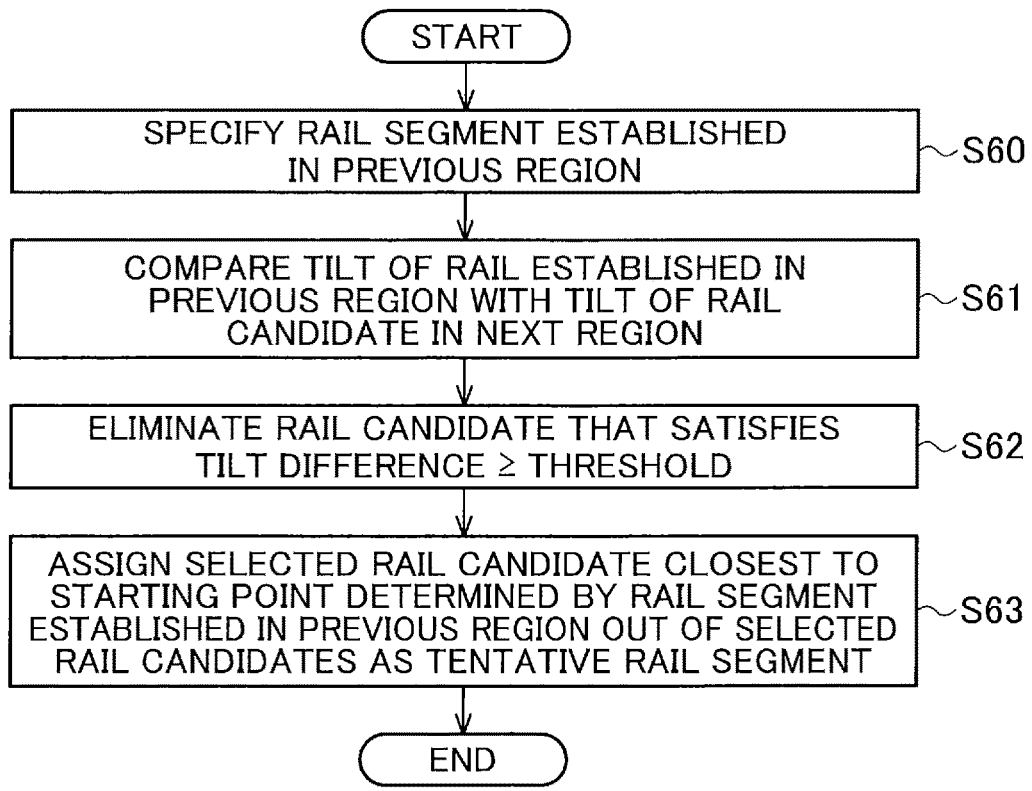
FIG. 18 is a flowchart illustrating the processing by a next-region-rail assigning unit.

FIG. 18 is a flowchart illustrating the processing by the next-region-rail assigning unit 138.

The next-region-rail assigning unit 138 specifies a rail segment established in a previous region (step S60).

Next, the next-region-rail assigning unit 138 compares the tilt of the rail segment established in the previous region and the tilt of a rail candidate in a next region (step S61).

The next-region-rail assigning unit 138 eliminates rail candidates of which the difference between the tilt of the rail segment established in the previous region and the tilt of the rail segment established in the next region is equal to or greater than a predetermined threshold from the selected rail candidates (step S62).

The next-region-rail assigning unit 138 assigns a rail candidate extending upward from a point closest to a starting point in the next region as a tentative rail segment (step S63).

Figure 19:
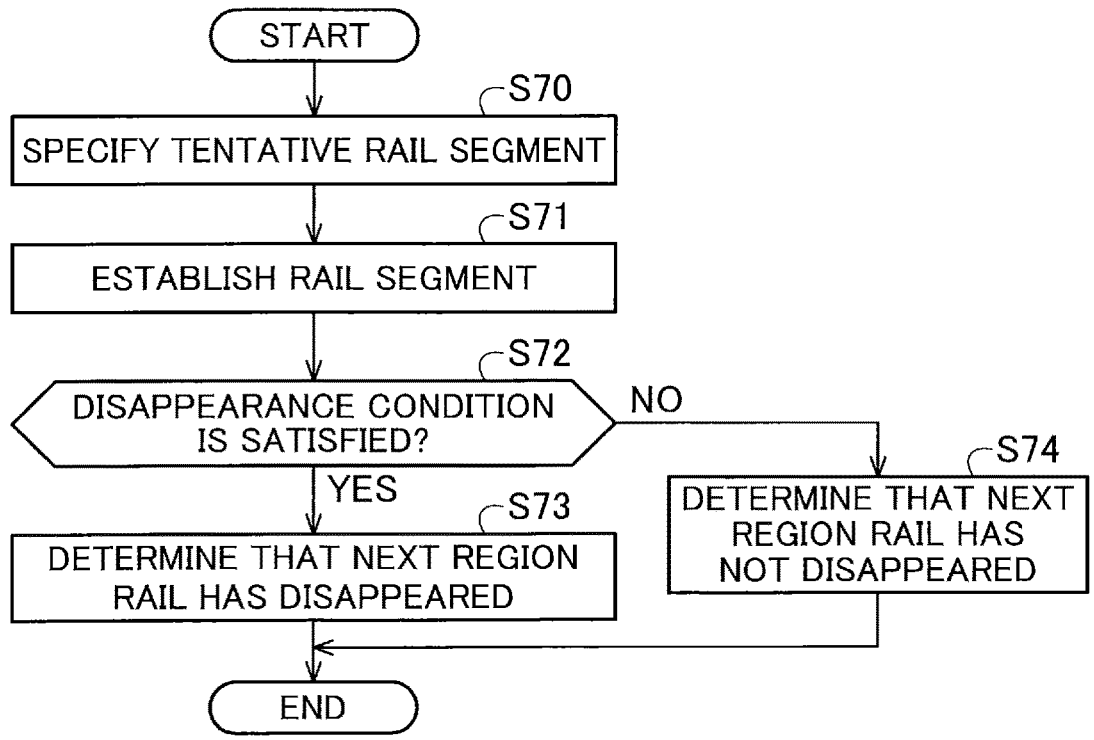
FIG. 19 is a flowchart illustrating the processing by a next-region-rail disappearance determining unit.

FIG. 19 is a flowchart illustrating the processing by the next-region-rail disappearance determining unit 139.

First, the next-region-rail disappearance determining unit 139 specifies a tentative rail segment assigned by the next-region-rail assigning unit 138 in a next region (step S70).

The next-region-rail disappearance determining unit 139 determines whether or not the distance between the starting point and the lowest end of the tentative rail segment corresponding to the starting point is equal to or greater than a predetermined threshold to specify a tentative rail segment of which the distance is smaller than a threshold as a rail segment (step S71).

Next, the next-region-rail disappearance determining unit 139 determines whether or not a disappearance condition is satisfied (step S72). If the disappearance condition is satisfied (Yes in step S72), the process proceeds to step S73, and if the disappearance condition is not satisfied (No in step S72), the process proceeds to step S74.

In step S73, the next-region-rail disappearance determining unit 139 determines that the rails have disappeared in the next region.

In step S74, the next-region-rail disappearance determining unit 139 determines that the rails have not disappeared in the next region.

Figure 20:
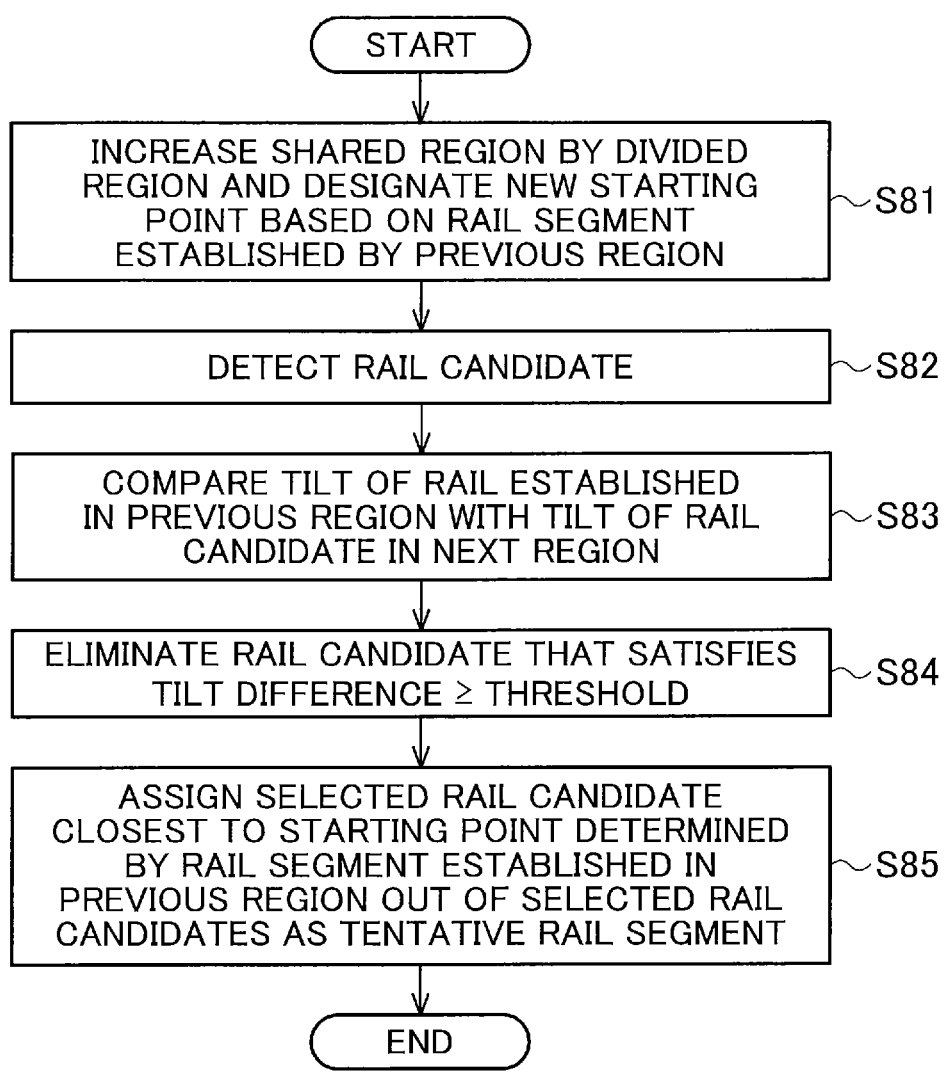
FIG. 20 is a flowchart illustrating the process of rail reassignment in a next region.

FIG. 20 is a flowchart illustrating the process of rail reassignment in a next region.

First, the next-region rail-starting-point redesignating unit 140 shifts a next region to include a divided region directly below the next region and designates a new starting point in the new next region (step S81).

Next, the rail-candidate detecting unit 133 detects rail candidates in the next region (step S82).

Next, the next-region-rail assigning unit 138 compares the tilt of a rail segment established in a previous region and the tilt of a rail candidate in the next region (step S83).

The next-region-rail assigning unit 138 eliminates rail candidates of which the difference between the tilt of the rail segment established in the previous region and the tilt of the rail segment established in the next region is equal to or greater than a predetermined threshold from the selected rail candidates (step S84).

The next-region-rail assigning unit 138 assigns a rail candidate extending upward from a point closest to a starting point in the next region as a tentative rail segment (step S85).

As described above, according to the present embodiment, even when rails are not clearly visible in an image due to a shadow of a vehicle or the like, the rails can certainly be detected in the image.

DESCRIPTION OF REFERENCE CHARACTERS 100 rail detection system; 101 imaging device; 102 display device; 110 rail detecting device; 120 storage unit; 130 moving-image input unit; 131 rail-detection-area designating unit; 132 rail-detection-area dividing unit; 133 rail-candidate detecting unit; 134 starting-region rail-starting-point designating unit; 135 starting-region-rail assigning unit; 136 starting-region-rail disappearance determining unit; 137 starting-region rail-starting-point redesignating unit; 138 next-region-rail assigning unit; 139 next-region-rail disappearance determining unit; 140 next-region rail-starting-point redesignating unit; 141 rail-detection-result generating unit; 142 rail-detection-result outputting unit.

What is claimed is:

1. A rail detecting device comprising:
   a processor to execute a program; and
   a memory to store the program which, when executed by the processor, performs processes of,
   designating a region including two rails as a rail detection area in an image including the two rails;
   dividing the rail detection area vertically and generating a plurality of rail-candidate detection regions in such a manner that adjacent rail-candidate detection regions of the plurality of rail candidate regions overlap each other;
   setting a lowest rail-candidate detection region out of the plurality of rail-candidate detection regions as a starting region and designating points at predetermined positions on a lower edge of the starting region as starting points of the two rails;
   detecting a plurality of lines in the starting region as a plurality of rail candidates, the lines being candidates of edges of the two rails;
   assigning rail candidates whose lowest ends are closest to the corresponding starting points out of the plurality of rail candidates as tentative rail segments;
   establishing the tentative rail segments as rail segments when distances between the lowest ends of the tentative rail segments and the starting points are smaller than a first threshold and determining whether or not portions of the two rails have been detected based on the rail segments; and
   setting a modified starting region by shifting the starting region upward when the portions of the two rails are not detected based on the rail segments and designating points at predetermined positions on a lower edge of the modified starting region as modified starting points, the modified starting points being starting points of the two rails; wherein,
   the processor detects a plurality of lines as a plurality of modified rail candidates in the modified starting region, the lines being candidates of edges of the two rails,
   the processor assigns modified rail candidates whose lowest ends are closest to the modified starting points out of the plurality of modified rail candidates as tentative modified rail segments,
   when distances between the lowest ends of the tentative modified rail segments and the modified starting points are smaller than the first threshold, the processor establishes the tentative modified rail segments as modified rail segments and determines portions of the two rails have been detected based on the modified rail segments, and
   the program, when executed by the processor, further performs a process of causing a display to display a rail detection result, the rail detection result indicating the portions of the two rails which have been detected.

2. The rail detecting device according to claim 1, wherein the processor sets a rail-candidate detection region directly above the starting region out of the plurality of rail-candidate detection regions as the modified starting region.

3. The rail detecting device according to claim 1, wherein,
   when the two rails are detected based on the rail segments or the modified rail segments, the processor defines the starting region or the modified starting region as a previous region, defines a rail-candidate detection region directly above the previous region out of the plurality of rail-candidate detection regions as a next region, and detects a plurality of lines in the next region as a plurality of next rail candidates, the lines being candidates of edges of the two rails,
   the processor designates intersections of a lower edge of the next region and the rail segments or the modified rail segments as next starting points, defines next rail candidates whose tilt differs from a tilt of the rail segments or the modified rail segments by less than a second threshold out of the plurality of next rail candidates as selected next rail candidates, and assigns selected next rail candidates whose lowest ends are closest to the corresponding next starting points out of the selected next rail candidates as tentative next rail segments,
   the processor establishes the tentative next rail segments as next rail segments when distances between lowest ends of the tentative next rail segments and the next starting points are smaller than the first threshold and determines whether or not portions of the two rails have been detected based on the next rail segments, the next rail segments being rail segments,
   the processor sets a modified next region by shifting the next region downward when portions of the two rails are not detected based on the next rail segments and designates intersections of on a lower edge of the modified next region and the rail segments or the modified rail segments as modified next starting point,
   the processor detects a plurality of lines as a plurality of modified next rail candidates in the modified next region, the lines being candidates of edges of the two rails,
   the processor defines modified next rail candidates whose tilt differs from a tilt of the rail segments or the modified rail segments by less than the second threshold out of the plurality of modified next rail candidates as selected modified next rail candidates, and assigns selected modified next rail candidates whose lowest ends are closest to the modified next starting points out of the selected modified next rail candidates as tentative modified next rail segments, and the processor establishes the tentative modified next rail segments as modified next rail segments when distances between the lowest ends of the tentative modified next rail segments and the modified next starting points are smaller than the first threshold and determines portions of the two rails have been detected based on the modified next rail segments, the modified next rail segments being rail segments.

4. The rail detecting device according to claim 2, wherein, when the two rails are detected based on the rail segments or the modified rail segments, the processor defines the starting region or the modified starting region as a previous region, defines a rail-candidate detection region directly above the previous region out of the plurality of rail-candidate detection regions as a next region, and detects a plurality of lines in the next region as a plurality of next rail candidates, the lines being candidates of edges of the two rails, the processor designates intersections of a lower edge of the next region and the rail segments or the modified rail segments as next starting points, defines next rail candidates whose tilt differs from a tilt of the rail segments or the modified rail segments by less than a second threshold out of the plurality of next rail candidates as selected next rail candidates, and assigns selected next rail candidates whose lowest ends are closest to the corresponding next starting points out of the selected next rail candidates as tentative next rail segments;

the processor establishes the tentative next rail segments as next rail segments when distances between lowest ends of the tentative next rail segments and the next starting points are smaller than the first threshold and determines whether or not portions of the two rails have been detected based on the next rail segments, the next rail segments being rail segments, the processor sets a modified next region by shifting the next region downward when portions of the two rails are not detected based on the next rail segments and designates intersections of on a lower edge of the modified next region and the rail segments or the modified rail segments as modified next starting point, the processor detects a plurality of lines as a plurality of modified next rail candidates in the modified next region, the lines being candidates of edges of the two rails, the processor defines modified next rail candidates whose tilt differs from a tilt of the rail segments or the modified rail segments by less than the second threshold out of the plurality of modified next rail candidates as selected modified next rail candidates, and assigns selected modified next rail candidates whose lowest ends are closest to the modified next starting points out of the selected modified next rail candidates as tentative modified next rail segments, and the processor establishes the tentative modified next rail segments as modified next rail segments when distances between the lowest ends of the tentative modified next rail segments and the modified next starting points are smaller than the first threshold and determines portions of the two rails have been detected based on the modified next rail segments, the modified next rail segments being rail segments.

5. The rail detecting device according to claim 3, wherein the processor divides the rail detection area vertically into a plurality of divided regions and generates a plurality of rail-candidate detection regions from the divided regions, the rail-candidate detection regions each including at least three contiguous divided regions in such a manner that two rail-candidate detection regions adjacent to each other share at least one divided region.

6. The rail detecting device according to claim 4, wherein the processor divides the rail detection area vertically into a plurality of divided regions and generates a plurality of rail-candidate detection regions from the divided regions, the rail-candidate detection regions each including at least three contiguous divided regions in such a manner that two rail-candidate detection regions adjacent to each other share at least one divided region.

7. The rail detecting device according to claim 5, wherein the processor sets the modified next region in such a manner that the modified next region includes a divided region directly below the next region out of the plurality of divided regions.

8. The rail detecting device according to claim 6, wherein the processor sets the modified next region in such a manner that the modified next region includes a divided region directly below the next region out of the plurality of divided regions.

9. The rail detecting device according claim 1, wherein the processor determines that portions of the two rails have been detected based on the rail segments when two or more of the rail segments are established and a gap between two of the rail segments is equal to or greater than a third threshold, and determines that portions of the two rails have been detected based on the modified rail segments when two or more of the modified rail segments are established and a gap between two of the modified rail segments is equal to or greater than the third threshold.

10. The rail detecting device according claim 2, wherein the processor determines that portions of the two rails have been detected based on the rail segments when two or more of the rail segments are established and a gap between two of the rail segments is equal to or greater than a third threshold, and determines that portions of the two rails have been detected based on the modified rail segments when two or more of the modified rail segments are established and a gap between two of the modified rail segments is equal to or greater than the third threshold.

11. The rail detecting device according to claim 3, wherein, the processor determines that portions of the two rails have been detected based on the next rail segments when two or more of the next rail segments are established and a gap between two of the next rail segments is equal to or greater than a third threshold, and determines that portions of the two rails have been detected based on the modified next rail segments when two or more modified next rail segments are established and a gap between two of the modified next rail segments is equal to or greater than the third threshold.

12. The rail detecting device according to claim 4, wherein, the processor determines that portions of the two rails have been detected based on the next rail segments when two or more of the next rail segments are established and a gap between two of the next rail segments is equal to or greater than a third threshold, and determines that portions of the two rails have been
detected based on the modified next rail segments when
two or more modified next rail segments are established
and a gap between two of the modified next rail
segments is equal to or greater than the third threshold.

13. The rail detecting device according to claim 5, wherein, the processor determines that portions of the two rails have been detected based on the next rail segments when two or more of the next rail segments are established and a gap between two of the next rail segments is equal to or greater than a third threshold, and determines that portions of the two rails have been detected based on the modified next rail segments when two or more modified next rail segments are established and a gap between two of the modified next rail segments is equal to or greater than the third threshold.

14. The rail detecting device according to claim 6, wherein, the processor determines that portions of the two rails have been detected based on the next rail segments when two or more of the next rail segments are established and a gap between two of the next rail segments is equal to or greater than a third threshold, and determines that portions of the two rails have been detected based on the modified next rail segments when two or more modified next rail segments are established and a gap between two of the modified next rail segments is equal to or greater than the third threshold.

15. The rail detecting device according to claim 7, wherein, the processor determines that portions of the two rails have been detected based on the next rail segments when two or more of the next rail segments are established and a gap between two of the next rail segments is equal to or greater than a third threshold, and determines that portions of the two rails have been detected based on the modified next rail segments when two or more modified next rail segments are established and a gap between two of the modified next rail segments is equal to or greater than the third threshold.

16. The rail detecting device according to claim 8, wherein, the processor determines that portions of the two rails have been detected based on the next rail segments when two or more of the next rail segments are established and a gap between two of the next rail segments is equal to or greater than a third threshold, and determines that portions of the two rails have been detected based on the modified next rail segments when two or more modified next rail segments are established and a gap between two of the modified next rail segments is equal to or greater than the third threshold.

17. A rail detection method comprising:

designating a region including two rails as a rail detection area in an image including the two rails;

dividing the rail detection area vertically and generating a plurality of rail-candidate detection regions in such a manner that adjacent rail-candidate detection regions of the plurality of rail candidate regions overlap each other;

setting a lowest rail-candidate detection region out of the plurality of rail-candidate detection regions as a starting region and designating points at predetermined positions on a lower edge of the starting region as starting points of the two rails;

detecting a plurality of lines in the starting region as a plurality of rail candidates, the lines being candidates of edges of the two rails;

assigning rail candidates whose lowest ends are closest to the corresponding starting points out of the plurality of rail candidates as tentative rail segments;

establishing the tentative rail segments as rail segments when distances between the lowest ends of the tentative rail segments and the starting points are smaller than a first threshold and determining whether or not portions of the two rails have been detected based on the rail segments;

setting a modified starting region by shifting the starting region upward when the portions of the two rails are not detected based on the rail segments and designating points at predetermined positions on a lower edge of the modified starting region as modified starting points, the modified starting points being starting points of the two rails;

detecting a plurality of lines as a plurality of modified rail candidates in the modified starting region, the lines being candidates of edges of the two rails;

assigning modified rail candidates whose lowest ends are closest to the modified starting points out of the plurality of modified rail candidates as tentative modified rail segments;

establishing the tentative modified rail segments as modified rail segments and determining portions of the two rails have been detected based on the modified rail segments when distances between lowest ends of the tentative modified rail segments and the modified starting points are smaller than the first threshold; and displaying a rail detection result, the rail detection result indicating the portions of the two rails which have been detected.

* * * * *